Sept. 28, 1948.         F. H. VALITON         2,450,313
              TOP MILK EXTRACTOR
              Filed May 22, 1946
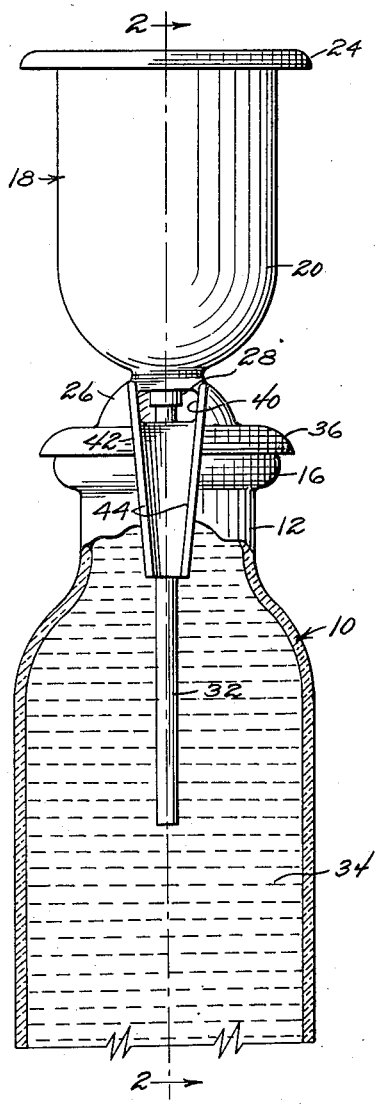
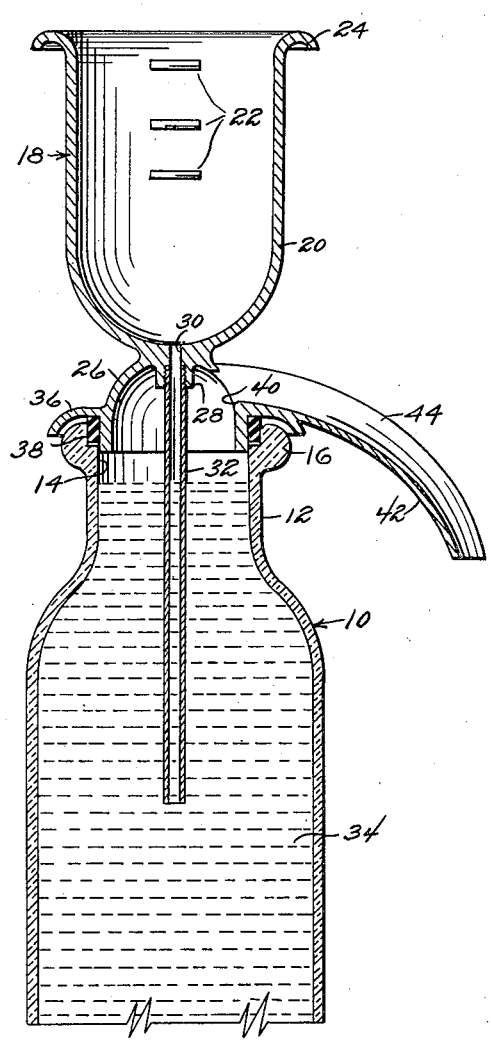
INVENTOR.
Frederick H. Valiton
BY Victor J. Evans & Co.
ATTORNEYS Patented Sept. 28, 1948

2,450,313

UNITED STATES PATENT OFFICE 2,450,313

TOP MILK EXTRACTOR

Frederick H. Valiton, Deer Lodge, Mont., assignor of one-half to Charles L. Colbert, Deer Lodge, Mont.

Application May 22, 1946, Serial No. 671,520

2 Claims. (Cl. 210—51.5)

1

This invention relates to a top milk extractor for use with the conventional type of milk bottles in use at the present time.

An object of this invention is to provide a device that will separate the cream from the milk by the flotation method.

Another object of the invention is to provide a device that is simple in construction, easy to operate and to clean, efficient in operation and can be manufactured at a nominal cost.

With the above and other objects in view the invention consists of the novel details of construction, arrangement and combination of parts more fully hereinafter described, claimed and illustrated in the accompanying drawing in which:

Figure 1 is an elevational view of an embodiment of the invention as applied to a milk bottle shown in section; and Figure 2 is a sectional view on the line 2—2 of Figure 1.

Referring more in detail to the drawing the reference numeral 10 designates a conventional milk bottle having the neck 12 and opening 14 surrounded by the annular bead 16 with which the cream or top milk extractor 18 is used.

The extractor 18 comprises the upper bowl portion 20 having protruding graduating marks 22 formed on the inner surface thereof and provided with a downwardly curved peripheral flange 24. Formed integral with the portion 20 is the inverted semi-spherical portion 26 having the internally threaded lug 28 formed at the center thereof to communicate with the opening 30 at the bottom of the portion 20. Threadably secured to the lug 28 is the tubular member 32 which extends downwardly into the contents 34 of the bottle 10.

Adjacent the lower edge of the portion 20 and formed on the outer surface thereof is the downwardly curved annular collar 36 which is adapted to conform to the shape and size of the bead 16.

It will be seen that when the lower end of the portion 26 is inserted in the opening 14 a resilient gasket 38 engages the outer side of the portion 26 and the inner side of the opening 14 to provide a sealed joint.

The portion 26 is provided with an opening 40 which communicates with and conforms to the curved spout 42 having upturned marginal sides 44. The extractor 18 previously described may be made of metal, Pyrex or any plastic material that will stand hot water and the material used may be either opaque or transparent.

During operation of the exterior 18 the member 32 is inserted into the bottle 10 and the gasket 38 is pressed downward until the collar 36 engages the bead 16. Milk from a separate bottle is poured into the portion 20 until it reaches the level of the upper mark 22. This milk will run down the member 32 displacing the cream by the flotation method causing it to be discharged through the opening 40 down the spout 42 into a separate container under the spout. It is to be understood that the density of the cream desired is regulated by the amount of milk poured into the portion 20 which can be determined by the marks 22.

It is believed that the operation and construction of the extractor will be apparent to those skilled in the art and it is to be understood that changes in the details of construction, arrangement and combination of parts may be resorted to provided they fall within the spirit of the invention and the scope of the appended claims.

Having thus described the invention, what is claimed as new and desired to be secured by Letters Patent is:

1. A device of the character described, comprising a bowl portion, an inverted semi-spherical portion formed on the bottom of said bowl portion, an internally threaded lug formed at the center of said semi-spherical portion, a tubular member secured to said lug, an opening in the bottom of said bowl portion communicating with said lug, a downwardly curved collar portion on said semi-spherical portion adapted to engage the upper edge of a container, an opening in said semi-spherical portion and a downwardly curved spout formed on said semi-spherical portion and communicating with the opening therein.

2. The invention as in claim 1 wherein said bowl portion is provided with a downwardly curved peripheral flange, graduating marks on the inner surface thereof and sealing means is provided at the upper edge of the container.

FREDERICK H. VALITON.

REFERENCES CITED

The following references are of record in the file of this patent:

UNITED STATES PATENTS

| Number | Name | Date |
|---|---|---|
| 306,935 | Lincoln | Oct. 21, 1884 |
| 611,275 | Rector | Sept. 27, 1898 |
| 878,389 | Henry | Feb. 4, 1908 |
| 1,042,909 | Graham | Oct. 29, 1912 |
| 1,083,560 | Reynolds | Jan. 6, 1914 |
| 1,615,765 | Laws | Jan. 25, 1927 |